(12) United States Patent
Jackeschky

(10) Patent No.: US 6,177,120 B1
(45) Date of Patent: Jan. 23, 2001

(54) DIETARY LOW CHOLESTEROL WHOLE EGG OR EGG YOLK PRODUCT

(76) Inventor: Martin Jackeschky, Moltkestrasse 86, Kiel (DE), 24105

( * ) Notice: Under 35 U.S.C. 154(b), the term of this patent shall be extended for 0 days.

(21) Appl. No.: 09/114,145

(22) Filed: Jul. 13, 1998

Related U.S. Application Data

(62) Division of application No. 08/664,934, filed on May 20, 1996, now Pat. No. 5,780,095, which is a continuation-in-part of application No. 08/256,665, filed as application No. PCT/EP92/00159 on Jan. 24, 1992, now abandoned.

(51) Int. Cl.[7] .............................. A23L 1/32; A23L 1/28; A23L 1/31; A23B 4/03; A23J 1/09
(52) U.S. Cl. .................. 426/614; 426/429; 426/471; 426/472; 426/480; 426/490
(58) Field of Search .................... 426/614, 385, 426/429, 471, 472, 480, 490, 425

(56) References Cited

U.S. PATENT DOCUMENTS

| | | | |
|---|---|---|---|
| 3,594,183 | * 7/1971 | Melnick et al. | 426/614 |
| 4,738,853 | * 4/1988 | Horrobin | 426/2 |
| 5,063,077 | * 11/1991 | Vollbrecht et al. | 426/614 |
| 5,116,628 | * 5/1992 | Ogasahara et al. | 426/614 |
| 5,468,511 | 11/1995 | Zeidler . | |
| 5,487,911 | * 1/1996 | Ueda et al. | 426/614 |

FOREIGN PATENT DOCUMENTS

| | | |
|---|---|---|
| 62-269649 | * 11/1987 | (JP) . |
| 63-109757 | * 5/1988 | (JP) . |

OTHER PUBLICATIONS

Database Abstract. Derwent–Acc–No: 1995–366816. For CN 1095899. Inventor: Chen, Dec. 7, 1994.*

* cited by examiner

*Primary Examiner*—Anthony J. Weier
(74) *Attorney, Agent, or Firm*—Karen Lee Orzechowski; Liniak, Berenato, Longacre & White, LLC

(57) ABSTRACT

A dietetic, chloresterol-reduced whole egg or egg yolk product and its method of preparation in which the whole egg or the yolk is dehydrated, a grain size of about $150\mu$ to about $300\mu$ is formed, the grains are suspended in a low-cholesterol liquid food oils, the cholesterol is dispersed into the liquid food oil, and the cholesterol enhanced liquid food oil is removed, wherein the grain size is maintained throughout the chloresterol reduction process.

14 Claims, 1 Drawing Sheet

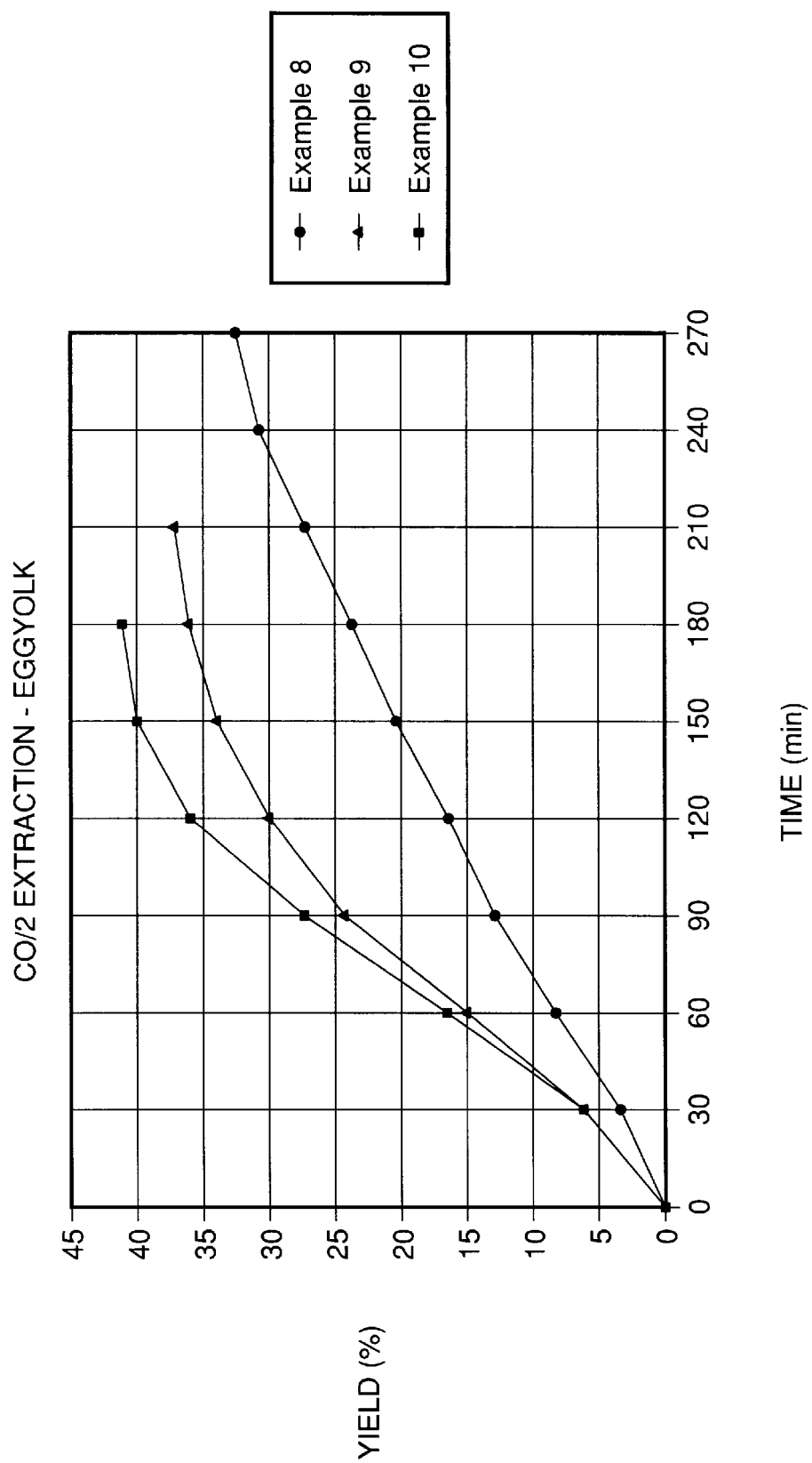

DIETARY LOW CHOLESTEROL WHOLE EGG OR EGG YOLK PRODUCT

CROSS-REFERENCE TO RELATED APPLICATION

This application is a Divisional of U.S. patent application Ser. No. 08/664,934 filed May 20, 1996, now U.S. Pat. No. 5,780,095 which is a continuation-in-part of U.S. patent application Ser. No. 08/256,665, filed Jul. 19, 1994, now abandoned, which is a 371 of PCT/EP92/00159, filed Jan. 24, 1992.

FIELD OF THE INVENTION

The invention relates to a method for preparing a dietetic, cholesterol-reduced, whole egg or egg yolk product, and also to the products themselves and their use in making foodstuffs. The invention further relates to an egg extract resulting from the method of the present invention and its use as a foodstuff additive.

BACKGROUND OF THE INVENTION

Whole eggs and their yolks, particularly chicken eggs, contain nutritionally physiologically valuable components such as proteins, for instance vitellin, phosphorous lipids (lecithins), as well as medically undesirable materials such as cholesterol. Cholesterol is present in the fat fraction of the egg yolk and, together with the equally undesirable saturated fatty acids, amounts to about 20% of the valuable weight of the yolk.

For numerous health and dietary reasons, it is especially desirable to reduce the cholesterol proportion in the yolk. In this regard, many attempts have been made to remove the cholesterol from eggs and egg yolks.

Attempts to achieve cholesterol reduction have included removal of the fat fraction of the egg yolk by total extraction with a solvent such as hexane. While this procedure allows removal of the cholesterol, it also has the undesirable side effect of removing or extracting, all or in part, the medically desirable lecithins. Moreover it is impossible to entirely remove the extractant, for instance hexane, from the egg yolk without thereby harming the product. Another way to remove cholesterol from the egg yolk is by means of high-pressure extraction using super-critical fluids such as $CO_2$. High-pressure extraction allows selective removal of the cholesterol together with other fats contained in the egg yolk without thereby reducing the lecithin content. However this procedure incurs the drawback of very long treatment times since the cholesterol is absorbed by the fluid flow as the last substance of the egg-yolk fat fraction. As a result, partial denaturing of the egg yolk proteins easily take place at the temperatures and pressures required for high-pressure extraction.

Another way to remove cholesterol from yolk is by adding cyclodextrin to the liquid yolk. Cyclodextrin selectively encloses cholesterol. Following a given time of application, the cyclodextrin together with the enclosed matter can be removed from the yolk. But on economic grounds this procedure is not yet widely marketed.

Other treatment processes, such as that shown in Japanese Patent No. 63-109757, have attempted to reduce the cholesterol content of the egg or egg yolk by vigorously mixing it with an extractant in which the cholesterol is soluble. To maximize the surface area of the egg exposed to the extractant fluid, and thus maximize the extraction of the cholesterol, very small particle sizes are vigorously agitated with the extractant in a homogenizer. However, this has resulted in changes to the egg product that adversely affects the flavor and the texture. The high shearing action alters the protein structures in the egg as well as the structures of other components.

Accordingly it is the object of the present invention to create a medically acceptable method for the preparation of cholesterol-reduced, full egg or egg-yolk products which has a taste similar to that of fresh eggs or egg yolks. Another object of the invention is to make available especially appropriate cholesterol-reduced, full egg or egg-yolk products.

SUMMARY OF THE INVENTION

It has unexpectedly been found that a dietetic, cholesterol-reduced egg or egg yolk product can be achieved that has a taste similar to that of fresh eggs or egg yolks, but with a greatly reduced cholesterol level. The cholesterol and lipids are removed from the egg by dehydrating the whole egg or the egg yolk, forming a grain size of about $150\mu$ to about $300\mu$, gently suspending the spray dried egg substance in a liquid food oil or a mixture of liquid food oils while maintaining the grain size so that the cholesterol and lipid fraction from the dehydrated egg substance is dispersed into the liquid food oil, and then removing the cholesterol and lipid fraction enhanced liquid food oil yielding a dietetic, cholesterol-reduced whole egg or egg yolk product with superior taste and attributes that is virtually indistinguishable from untreated eggs.

BRIEF DESCRIPTION OF THE DRAWING

FIG. 1 is a graph showing and comparing the course of extraction versus the yield for Examples 8, 9 and 10.

DETAILED DESCRIPTION OF THE INVENTION

In essence, the method of the invention consists of dehydrating the initial material in the form of whole eggs or egg yolks and there upon treating this dehydrated substance with an extractant based on a low-cholesterol, liquid food oil. The principle of the method is that the mixture being created from the fat fraction of the egg yolk and the added liquid food oil acquires a substantially uniform concentration of all fat components. In other words, the cholesterol from the egg-yolk fat fraction uniformly disperses in the low-cholesterol extractant. After the extractant has been removed, a substantial part of the egg-yolk cholesterol can therefore be eliminated in a single extraction step.

By granulating or agglomerating the dehydrated egg substances into a grain size of about $150\mu$ to about $300\mu$ has unexepcted resulted in a dietetic, cholesterol-reduced egg product with superior flavor and texture that is virtually indistinguishable from fresh untreated eggs. The grains can be formed by spray drying or any other suitable means known in the art. In a preferred embodiment, when spray-dried, the water is withdrawn in especially gentle manner from the initial whole egg or the yolk material, and the powder is granulated by instanization or agglomeration. This has also resulted in the cholesterol enhanced liquid food oil being easily and uniformly removed from the grains. Preferably the grains are maintained in size, or not significantly altered, during the cholesterol removal process of the present invention.

In a preferred embodiment of the invention, the extraction procedure is repeated several times, resulting in the cholesterol proportion in the egg yolk being easily lowered by at least 95%. Depending on the desired fat content of the final product, in the last do-oiling stage, where the cholesterol enhanced liquid food oil is removed from the cholesterol-reduced grains of egg substance, only a portion of the extractant liquid food oil is removed so that the desired fat content is reached.

Various food oils are conceivable an extractants. Illustratively, is a product is desired of which the egg-yolk composition corresponds substantially to that of the natural egg yolk, but lacking cholesterol, than a low-cholesterol egg oil should be used in the process of the present invention. Such egg oil may be prepared or instance by first extracting the granulated yolk substance with an arbitrary food oil and then removing cholesterol from the extract. Contrary to the conditions within the yolk, cholesterol is easily removed in a conventional manner from a fatty liquid. The decholester-olized extract of the first treatment stage can be used again as an extractant and becomes enriched in egg oil. When such treatment is repeated several times, an extractant increasingly enriched in yolk fats will be obtained which essentially evinces the composition of egg oil without cholesterol. If egg oil so enriched is used as the extractant, a cholesterol-free egg product is obtained which in other respects corresponds to the natural egg composition. However such a procedure is comparatively costly.

Desired liquid food oils include, conventional vegetal food oils and mixtures thereof. Suitable vegetal food oils include wheat germ oil, sunflower oil, soybean oil, palm oil, thistle oil and mixtures thereof. Besides their economy, such liquid food oils offer the further advantage of removing or lowering also the undesirable animal saturated fatty acids besides the cholesterol and that where called for enrichment with unsaturated, vegetal fatty acids and oil-soluble vitamins will be possible.

The cholesterol enhanced liquid food oil faction can be removed from the granulated, dehydrated whole egg or egg yolk by any conventional means that keeps the grains from being crushed or otherwise reduced in size. Suitable processes include decanting, separation, filtration, and centrifuging. Most preferably, centrifuging is used to in the de-oiling stage to separate the cholesterol enhanced liquid food oil faction from the grains of the cholesterol-reduced dehydrated egg.

Nevertheless the extractant liquid food oil cannot be fully removed from the treated egg material by the above described de-oiling procedure. In almost all cases however the main interest will be to make a product free of cholesterol; the complete removal of any fat is not mandatory. On the contrary, it may be advantageous that the cholesterol-free product in addition contain for instance high-grade fatty acids from vegetal oils.

Nonetheless it may be necessary—for instance regarding the nutrition of athletes—to make available a full egg or yolk product entirely free of fat. In such a case, another embodiment of the present invention provides that the practically cholesterol-free egg substance obtained following the last de-oiling stage be additionally extracted with supercritical fluids. Preferably, the egg substance so prepared shall be formed into a grain size of 0.5 to 2 mm prior to fluid extraction. The fluid flows especially easily through each a granulated egg substance. However the described high-pressure extraction makes sense only when the extractants are vegetal food oils and where multiple extractions are carried out.

In contrast to animal fats, vegetal fats disperse relatively easily in the fluid flow and can be extracted within short treating intervals. The initially described drawbacks when treating natural egg yolk with supercritical fluids do not arise in such a procedure; therefore a fully fat-free product is prepared in gentle manner. In this respect it was furthermore found advantageous if from about 0.1 to 2% of an electrolyte, for instance cooking salt and/or sodium citrate are added to the initial whole egg or egg yolk material prior to spray-drying. The presence of such salts in the egg substance additionally protects against any protein denaturing.

In an alternative to the just above described fluid extraction or as a preliminary stage thereto, during the last de-oiling stage in which the excess extractant liquid food oil is removed, an inert gas, possibly at excess pressure, is forced through the egg substance in order to remove in this manner any oil not firmly absorbed, as a carried out in an inert gas atmosphere.

As already mentioned initially, the medically undesired substances, in particular cholesterol, are contained almost exclusively in the yolk. The pure chicken egg white substantially consists of a mixture of albumin and globulin and as such is dietetically unobjectionable. Accordingly most cases will not require using the whole egg for the method of the invention; instead it will be enough to solely treat the yolk. Treating only the yolk offers the advantage that the controlled extraction is the possible. Moreover the quantities to be processed are then less. Therefore it may be assumed as a rule that egg yolk will be processed in the method of the invention.

In cases where egg yolk is the initial material while a substantially whole egg composition is desired as the dietetic end product, the treated mass of yolk is mixed with spray-dried egg white protein in such an amount as corresponds to the natural whole egg composition.

Furthermore the invention concerns a dietetic egg yolk or a whole egg product which can be prepared using vegetal food oils. As a rule, the cholesterol-lowering products of the present invention will still contain some extractant liquid food oil; in other words the initial fat fraction contained in the yolk is replaced in part or in whole by vegetal food oil. Such products therefore are not only low in cholesterol, but also they are enriched with essential vegetal fatty acids, which are especially valuable dietetically.

The egg product of the invention can be prepared by extraction using arbitrary vegetal food oils. Accordingly an arbitrary number of different products based on the different food oils are conceivable. Preferably however the product shall contain "red palm oil" at least admixed to another vegetal food oil. "Red palm oil" is an excellent anti-oxidant and assures long storage life of the egg products of the invention, i.e., that they shall not rancidify prematurely.

Another advantageous egg product of the present invention essentially contains the same fat proportion as an untreated whole egg or yolk, except that the fat fraction of the egg product consists of vegetal food oil. Illustratively such a product may be used and processed exactly like yolk in the quantities specified in recipes.

The egg products prepared by the method of the invention are directly applicable to the preparation of dietetic foodstuffs. They contain no substances which must be listed under law. The extraction of preparation of the products are implemented solely with unobjectionable foodstuffs. Therefore the invention also concerns the use of the egg products prepared by the method of the invention when making dietetic foodstuffs.

The extractant removed from the egg substance during the de-oiling accumulates as a byproduct in the course of the method of the invention. Depending on the implementation of said method, the natural yolk fats and any other oil-soluble substances in this extractant will be enriched to much different degrees. It was found in the first place that this egg extract is an excellent emulsifier. Furthermore the cholesterol enriched in the extract can be easily removed, for instance by means of enclosure compound (adductive crystallization). Accordingly the egg extract may be used as a natural colorant (yolk color) or as a flavoring agent (aroma) in foodstuffs, without entailing a declaration of additive.

The invention is elucidated below by means of several examples.

EXAMPLE 1

1,00 g of spray-dried normal egg yolk powder are gently suspended in 1.5 liter of 40° C. soybean oil so that the grain size is not altered, and following a rest of about 10 minutes for the extractant to act are de-oiled in a screen centrifuge (centrifuge coefficient 1,300) and are after-treated four times each time with 0.5 liter soybean oil at 40° C. Then the egg substance was centrifuged dry for about 10 min. The yield was 1,085 g. The residual cholesterol proportion was 239 mg/100 g of powdered egg.

EXAMPLE 2

Processing takes place as in Example 1. However the drying procedure was modified in such a manner that the spray-dried yolk powder grains evinced higher porosity. The mean grain size was $255\mu$ was maintained throughout the cholesterol-reduction process. In this Example the yield was 1,040 g and the residual cholesterol was 223 mg/100 g of powdered egg.

EXAMPLE 3

Processing is carried out in the manner of Example 1; the powdered egg serving as the initial material was spray-dried in the manner of Example 2. In deviation from the procedure of Example 1 however, both the centrifuge space and the pre-introduction vessel were filled with an inert gas (in this instance $CO_2$) and kept at slight excess pressure. The inert gas was made to circulate between the centrifuge and the pre-introduction vessel.

The yield was 976 g and the residual cholesterol was 200 mg/100 g of powdered egg.

EXAMPLE 4

Processing was carried out as in Example 3. However a mixture of 0.250 liter soybean oil and 0.250 liter "red palm oil" was used for the fourth de-oiling. On account of its natural composition, "red palm oil" is a highly effective antioxidant. The extraordinarily high content of provitamin A (carotene) and the very high content of provitamin E (tocopherol) provide long-term protection and prevent premature rancidity of the egg product treated with palm oil. The yield was 977 g with a residual cholesterol of 200 mg/100 g of powdered egg.

Analysis of the powdered egg obtained in the manner of Example 4 shows the following composition in comparison with the untreated powdered egg.

| COMPONENT | UNITS | Sample 4 | Initial Material MEAN VALUES |
|---|---|---|---|
| water | g | 3.0 | 3.4 |
| protein | g | 34.8 | 31.7 |
| fats | g | 56.0 | 59.3 |
| carbohydrates | g | 2.5 | 2.1 |
| minerals | g | 3.7 | 3.5 |
| vitamin A | mg | 20.5 | 1.79 |
| vitamin E | mg | 215.0 | 5.60 |
| palmitic acid $C_{16}:0$ | g | 13.10 | 12.80 |
| stearic acid $C_{18}:0$ | g | 2.10 | 4.30 |
| palmitoleic acid $C_{16}:1$ | g | 0.24 | 4.10 |
| oleic acid $C_{18}:1$ | g | 16.96 | 26.40 |
| linolenic acid $C_{18}:2$ | g vitamin F | 21.41 | 10.80 |
| linolenic acid $C_{18}:3$ | g vitamin E | 2.85 | 1.65 |
| arachidonic acid $C_{20}:0$ | g | 0.10 | 0.30 |
| fatty acid $C_{22}:0$ | g | 0.01 | 0.10 |
| fatty acid $C_{22}:6$ | g | 0.01 | 0.10 |
| lecithin (egg) | mg | 12,400 | 12,500 |
| cholesterol | mg | 200 | 3,015 |
| sitosterol | mg | 138 | 0 |
| stigmasterol | mg | 52 | 0 |
| campesterol | mg | 48 | 0 |

The above Table shows the possibilities made available by the invention when using different vegetal oils (in this case soybean oil and palm oil) in the extraction:

1. lowering the cholesterol content by more than 90%,
2. practically unchanged content in egg lecithin,
3. increasing the provitamin A content ten-fold,
4. increasing the provitamin E content forty-fold,
5. increasing the provitamin F content about 100%.

EXAMPLE 5

The processing is that of Example 3. However the after-treatment each time with 0.5 liter soybean oil took place not four times, but eight times. The residual cholesterol in the powder egg now was only 51 mg/100 g of powdered egg, the total sterol content being 210 mg/ 100 g of powdered egg. This is a cholesterol rinsing rate of about 98%.

Regarding the Examples discussed above, it may be concluded that the oil content of powdered yolk can be substantially lowered using an efficient centrifuge or by extended after-centrifuging, the residual cholesterol content then being reduced again. A similar effect is achieved by passing the inert rising gas of Example 3 in pressurized manner through the egg substance.

EXAMPLE 6

In order to test the quality, powdered egg prepared in the manner of Example 4 was admixed in lieu of fresh yolk into 80% mayonnaise, 50% salad mayonnaise, 25% salad dressing and into egg-butter cream.

Standard recipes were used, each time exchanging 15 g of fresh yolk specified in the recipe with 7.65 g of the powdered yolk prepared in the manner of the invention and dissolved in 7.65 g water. In each case the quantity of yolk of the mayonnaise/dressings was 7.5% of the oil content relative to fresh yolk. Fresh yolk is converted into spray-dried powdered yolk in the following manner:

WEIGHT OF AN AVERAGE EGG=50g egg shell 6g
proportion of yolk 15 g/ spray-dried 7.65 g egg white proportion 29 g / spray-dried 3.77 g
SUM 50 g 11.42 g Independent tiers evaluated the products made from standard recipes using low-cholesterol powdered egg yolk. All products were rated "good" for appearance (same optical image), consistency (creaminess and feel to palate) and taste. No after-taste or other significant difference with products from fresh yolks was found.

EXAMPLE 7

Furthermore, according to the naturally found proportions, 7.65 g of the powdered yolk prepared in the manner of Example 4 were mixed with 3.77 g of spray-dried protein powder and thereby 11.42 g of a product evincing the composition of whole-egg powder were obtained. Batches of 11.42 g of this product when dissolved in 32.58 ml water were easily processed in lieu of eggs in various recipes.

To demonstrate for instance the comparable quality of whole-egg products so prepared, the following dishes were prepared as if in a kitchen and then tested:
- a) scrambled eggs with bacon
- b) noodles
- c) omelets/pancakes
- d) cake mix of the pound cake type
- e) doughnuts First a ready-mix was prepared for the products c), d) and e) corresponding to US industrial recipes; (a "ready-mix" is a pre-mixture containing all components such as eggs, spices etc and requiring only being stirred with water and milk prior to preparation). Again when testing the appearance and the taste, no perturbing difference over normal egg made comparison products was found.

The Example 8, 9 and 10 below concern treating natural egg yolk and egg yolk processed in the manner of the invention with supercritical fluids. All three test were carried out under the same, following conditions:

1) The yolk used as the initial material was dried to 2% residual moisture using pre-dried inert gas at 50° C., 2) The extraction vessel (diameter=11.5 cm) was filled with 1,000 g of egg product without raising the pressure, 3) extraction was carried out with pure $CO_2$ at 40° C., a pressure of 5,00 psi and a flow of 33 g $CO_2$/h per gram of yolk.

EXAMPLE 8

Normal, commercial powdered egg yolk was dried as stated above to a residual 2% moisture and was loosely filled into the extraction vessel. Extraction was carried out as in point the extraction vessel. Extraction was carried out as in point 3) for 4.5 h. When opening the apparatus, it was found the gas had formed channels and hence that extraction had taken place irregularly in the extraction cake. The loss in weight of the powdered egg was 35%, the residual cholesterol content of the extracted yolk was 1.34%

EXAMPLE 9

Powdered egg yolk was washed with soybean oil in the manner of Example 3 and then was granulated in a fluidized-bed granulator to a grain size of 1–2 mm and dried to a residual moisture of 2%. The dried yolk so prepared was filled into the extraction vessel and then was extracted under the conditions listed in the above point 3) for 3.5 h. The weight loss of the yolk granulated was 37%, the residual cholesterol content of the extracted yolk was 0.069% for a total sterol content of 0.11%.

EXAMPLE 10

Processing was carried out essentially as in Example 9 except that 1.5% of a mixture of cooking salt and calcium citrate was added to the yolk powder prior ro spray-drying. Extraction lasted about 3h. The weight loss of the yolk granulate was 43% for an oil yield of41.1%, the cholesterol content being 0.031% and the sterol content was 0.07%.

By using powdered eggs with lowered oil contents (see note in Example 5), it is possible to improve the economy of $CO_2$ extraction which—as shown by the attached graph—is poorest in Example 8 and best in Example 10.

In a further analysis, the egg granulate prepared in Example 9 and 10 evinced a practical absence of fat. Both granulates were creamy-white, lacked odor and evinced a slight yolk taste. Furthermore they were well soluble, and the lecithin content converted into fresh yolk practically was the same as the content of untreated yolk. Accordingly the granulates of Example 9 and 10 are well suited for recovery diets rich in protein and lecithin.

The last Example 11 concerns the vegetal oil used as extractant in the methods of Examples 1 through 4. This vegetal oil following extraction was collected separately and the n treated as follows:

The extraction oils separated from the powdered yolk and the extraction oil obtained for the first after-rinse were combined. Analysis showed the following composition:

| Total Sterol content: 1,442% | | |
|---|---|---|
| of which | cholesterol | 0.945% |
| | stigmasterol | 0.065 |
| | campesterin | 0.178 |
| | sitosterin | 0.254 |
| and | lecithin | 0.0099 |

The combined extraction oils were stored at 20° C. for 3 days and on further days at 10 to 12° C.

During this time waxy components settled at the bottom. The clear supernatant substance was decanted, the murky bottom substance was centrifuged at 10° C. or forced out by a filter press.

The cholesterol was recovered from the clear oil by known procedures such as enclosure compounds and by extraction. Following this treatment the clear oil could be used in many applications, for instance as emulsifier, flavoring agent (aroma) or yolk colorant.

What is claimed is:

1. A dietetic, cholesterol-reduced and essential vegetal fatty acid enriched whole egg or egg yolk product, wherein said whole egg or egg yolk product is prepared by removing cholesterol and lipids from the yolk by:
   a) dehydrating the whole egg or yolk substance by spray drying;
   b) forming a grain size of about 150μ to about 300μ;
   c) suspending the spray dried egg substance in a liquid food oil or a mixture of liquid food oils while maintaining the grain size, wherein said liquid food oil contains at least one essential vegetal fatty acid;
   d) dispersing the cholesterol and lipid fraction from the spray dried egg substance in the liquid food oil while maintaining the grain size; and
   e) removing the cholesterol and lipid fraction enhanced liquid food oil while retaining said essential vegetal fatty acid in said egg product so that egg product is enriched in said essential vegetal fatty acid.

2. The egg product of claim 1 further comprising adding a liquid food oil to said egg product so that the fat content of the egg product is essentially the same as the untreated egg or yolk.

3. The egg product of claim 1 wherein the liquid food oil is a mixture of vegetal food oils containing red palm oil.

4. A dietetic, cholesterol-reduced and essential vegetal fatty acid enriched whole egg product prepared by:
   a) separating the yolk from the white of the egg;
   b) dehydrating the yolk by spray drying;
   c) forming a grain size of about 150μ to about 300μ in the dehydrated yolk;
   d) suspending the spray dried yolk in a liquid food oil or a mixture of liquid food oils containing an essential vegetal fatty acid while maintaining the grain size.
   e) dispersing the cholesterol and lipid fraction from the spray dried yolk in the liquid food oil while maintaining the grain size;
   f) removing the cholesterol and lipid fraction enhanced liquid food oil to yield a cholesterol-reduced and essential vegetal fatty acid enriched yolk substance; and
   g) mixing the yolk substance with a quantity of spray dried egg white that corresponds to the natural whole egg composition.

5. A foodstuff ingredient comprising a dietetic, cholesterol-reduced and essential vegetal fatty acid enriched whole egg or egg yolk product, wherein said egg product is prepared by removing cholesterol and lipids from the yolk and enriching the yolk with an essential vegetal fatty acid by:
   a) dehydrating the whole egg or yolk substance by spray drying;
   b) forming a grain size of about 150μ to about 300μ;
   c) suspending the spray dried egg substance in a liquid food oil or a mixture of liquid food oils while maintaining the grain size, wherein said liquid food oil or mixture thereof contains an essential vegetal fatty acid;
   d) dispersing the cholesterol and lipid fraction from the spray dried egg substance in the liquid food oil while maintaining the grain size; and
   e) removing the cholesterol and lipid fraction enhanced liquid food oil while retaining the essential vegetal fatty acid in said egg substance in said egg product so that said egg product is enriched in said essential vegetal fatty acid.

6. An enriched extraction oil produced as a by-product of the product of claim 5 from which waxy components and cholesterol are removed.

7. An emulsifier, colorant or flavoring agent containing the enriched liquid food oil of claim 6.

8. The egg product of claim 1 wherein said essential vegetal fatty acid is selected from the group consisting of carotene, tocopherol, vitamin A, vitamin E, vitamin F, provitamin A, provitamin E, provitamin F, linolenic acid $C_{18}$:2, and linolenic acid $C_{18}$:3.

9. A dietetic, cholesterol-reduced and essential vegetal fatty acid enriched whole egg or egg yolk product with a long storage life, wherein said whole egg or egg yolk product is prepared by removing cholesterol and lipids from the yolk by:
   a) dehydrating the whole egg or yolk substance by spray drying;
   b) forming a grain size of about 150μ to about 300μ;
   c) suspending the spray dried egg substance in a liquid food red palm oil or a mixture of liquid food oils containing red palm oil while maintaining the grain size, wherein said liquid food oil contains at least one essential vegetal fatty acid;
   d) dispersing the cholesterol and lipid fraction from the spray dried egg substance in the liquid food oil while maintaining the grain size; and
   e) removing the cholesterol and lipid fraction enhanced liquid food oil while retaining said essential vegetal fatty acid in said egg product, wherein said essential vegetal fatty acid provides anti-oxidant properties and a longer storage life.

10. The egg product of claim 9 wherein said essential vegetal fatty acid is selected from the group consisting of carotene, tocopherol, vitamin A, vitamin E, vitamin F, provitamin A, provitamin E, provitamin F, linolenic acid $C_{18}$:2, and linolenic acid $C_{18}$:3.

11. The egg product of claim 10 wherein the provitamin A content is increased ten-fold.

12. The egg product of claim 10 wherein the provitamin E content is increased forty-fold.

13. The egg product of claim 10 wherein the provitamin F content is increased 100%.

14. The egg product of claim 10 wherein the cholesterol content is reduced by at least 90%.

* * * * *